Patented Feb. 12, 1952

2,585,884

UNITED STATES PATENT OFFICE 2,585,884

ESTERS OF ALIPHATIC TRIOLS

Richard R. Whetstone and De Loss E. Winkler, Berkeley, Calif., assignors to Shell Development Company, San Francisco, Calif., a corporation of Delaware No Drawing. Application October 4, 1948, Serial No. 52,786

7 Claims. (Cl. 260—410.6)

This invention relates to a new class of organic compounds and to their use as plasticizers for synthetic resins. More particularly the invention relates to a new class of esters of the saturated, open-chain hexanetriols, to their use as plasticizers for vinyl-type resins, and to the plasticized compositions produced thereby.

More specifically the invention provides a new and particularly useful class of neutral esters of hexanetriols described hereinafter and monocarboxylic acids containing 5 or more carbon atoms, and preferably not more than 15 carbon atoms.

The invention further relates to the use of this new class of esters as plasticizers for the vinyl-type resins and to the plasticized compositions produced thereby, said compositions being characterized by their improved resistance to shrinkage and deterioration after prolonged periods of exposure to high temperatures, to their improved resistance to water extraction and to their excellent strength and clear color.

Vinyl polymers in general possess desirable properties which make them potentially valuable material for the production of many industrial articles. The vinyl polymers are, however, not easily processed nor are they resilient so that it is usually preferred to incorporate a plasticizer with the said polymers before they can be utilized. The compound selected as the plasticizer for the vinyl polymers must meet certain strict requirements, i. e. the compound should be compatible with the polymers in amounts sufficient to impart the desired processing properties to the compounded resins, the resulting compounded resin should possess satisfactory strength and flexibility over a wide range of conditions, the resulting resin should not undergo shrinkage or deterioration due to evaporation of the plasticizer when the said resin is exposed to high temperatures, and the plasticizer should not adversely affect the odor, color and inflammability of the finished product. There have been many compounds suggested as plasticizers for the vinyl-type resins in various patents and in the literature. While many of the suggested compounds possess one or more of the above-described requirements none have been found which satisfy all of the necessary requirements. It has been discovered, for example, that most of the suggested plasticizers have a relatively high volatility and after the compounded resin has been exposed to high temperatures for a prolonged period the plasticizer is lost and the resin shrinks, becomes cracked or disintegrates entirely. Furthermore, many of the suggested plasticizers have poor resistance to water extraction and are readily removed from the resin when it is in contact with water.

It is, therefore, an object of the invention to provide a new class of plasticizers for the vinyl-type resins. It is a further object of the invention to provide plasticizers for the vinyl-type resins which possess substantially all of the above-described required properties. It is a further object to provide plasticizers for the vinyl-type resins which have relatively low volatility and are not readily lost from the compounded resin when it is exposed to high temperatures. It is a further object to provide a class of plasticizers having improved resistance to water extraction. It is a further object of the invention to provide a new class of organic compounds. It is a further object to provide a new class of esters of the saturated, open-chain hexanetriols which have unexpected properties enabling the said compounds to be used for many industrial applications. Other objects and advantages of the invention will be apparent from the following detailed description thereof.

It has now been discovered that these and other objects may be accomplished by a novel class of neutral esters of hexanetriols described hereinafter and monocarboxylic acids containing 5 or more carbon atoms and preferably not more than 15 carbon atoms. These hexanetriol esters have proved to be superior plasticizers for the vinyl-type resins as they are highly compatible therewith, and the resulting plasticized composition is easily processed and possesses a high degree of flexibility. In addition it has been discovered that the vinyl resins compounded with the novel esters have a greatly improved resistance to water extraction. Furthermore, the said esters have a relatively low volatility and the plasticized resins are able to withstand long periods of exposure to high temperatures without shrinking or undergoing any deterioration. This discovery was indeed surprising for glycerol esters of this type of acid and the lower esters of the hexanetriols possess rather poor properties as plasticizers for the vinyl resins, particularly in regard to volatility.

The hexanetriols which are utilized in producing the novel esters of the invention are hexanetriols possessing a straight chain of 6 carbon atoms to which all three of the hydroxyl groups are attached, two of the hydroxyl groups being attached directly to the two terminal chain carbon atoms, i. e. the number 1 and number 6 carbon atoms, and the third hydroxyl group being attached to the number 2 chain carbon atom so that there is a resulting unsymmetrical arrangement of hydroxyl groups on the chain of carbon atoms. The presence of this unique structural arrangement in the said triols endows their monocarboxylic acid esters described below with many unexpected and beneficial properties not possessed by similar esters of the symmetrical arranged triols, such as glycerol, trimethylolpropane, 1,3,5-pentanetroil, etc. The hydrogen atoms attached to the chain carbon atoms of the above-described hexanetriol molecule may be replaced if desired by other noninterfering substituents, such as alkyl radicals, preferably containing not more than 3 carbon atoms. Examples of the hexanetroils are 1,2,6-hexanetriol, 3,5-dimethyl-1,2,6-hexanetriol, 3-ethyl-1,2,6-hexanetriol, 4-methyl-1,2,6-hexanetriol, and the like. 1,2,6-hexanetriol is the more preferred triol to be used in producing the novel esters of the invention.

The above-described hexanetriols may be produced by any suitable method. The preferred method comprises hydrolyzing a cyclic dihydropyran compound containing a functional substituent, such as a formyl group or hydroxymethyl group, atttached directly to a ring carbon atom and hydrogenating the resulting product. 1,2,6,-hexanetriol may be produced by this method, for example by treating 3,4-dihydro-1,2-pyran-2-carboxyaldehyde with water at 85° C. for about 2.5 hours and then hydrogenating the resulting product with hydrogen gas in the presence of Raney nickel at 75° C. A more detailed description of this method of preparation may be found in co-pending application Whetstone, Serial No. 694,144, filed August 30, 1946.

The acids that are utilized in producing the novel esters of the invention are the monocarboxylic acids containing 5 or more carbon atoms and preferably not more than 15 carbon atoms. The monocarboxylic acids may be substituted or unsubstituted, saturated, unsaturated or aromatic. The monocarboxylic acids may be exemplified by valeric acid, methylvaleric acid, caproic acid, isocaproic acid, pelargonic acid, 3,3-dimethylbutyric acid, beta-ethylcaprylic acid, 2,5-diethylcaproic acid, 2-ethylbutyric acid, lauric acid, tridecanoic acid, sorbic acid, 5-hexenoic acid, 8-decenoic acid, 8-dodecenoic acid, cyclohexanoic acid, cyclopentanoic acid, benzoic acid, methylbenzoic acid and isopropylbenzoic acid.

A preferred group of acids to be used in the preparation of the novel esters are the unsubstituted monocarboxylic acids which are open-chained saturated acids containing from 5 to 9 carbon atoms with a straight chain of at least 4 carbon atoms joined directly to the carboxyl group. Examples of this preferred group of acids are 3,3-dimethylbutyric acid, valeric acid, enanthic acid, 2-ethylcaproic acid, caprylic acid, pelargonic acid, and caproic acid.

In producing the novel esters of the invention one of the above-described acids may be used to esterify the hexanetriol molecule or two or more different acids may be utilized. Examples of the novel hexanetriol esters of the invention are 1,2,6-hexanetriol divalerate caproate
1,2,6-hexanetriol trivalerate
1,2,6-hexanetriol tricaproate
1,2,6-hexanetriol tribenzoate
2-ethyl-1,2,6-hexanetriol trienanthate
3-methyl-1,2,6-hexanetriol trilaurate
1,2,6-hexanetriol tricyclohexanoate
3-methyl-1,2,6-hexanetriol dipelargonate caproate
1,2,6-hexanetriol triethylbutyrate
3-methyl-1,2,6-hexanetriol tridecenoate Examples of the preferred esters, i. e. those produced from the preferred group of hexanetriols and the preferred group of acids described above are 1,2,6-hexanetriol tricaproate
1,2,6-hexanetriol trivalerate
1,2,6-hexanetriol tripelargonate
1,2,6-hexanetriol dicaproate valerate
1,2,6-hexanetriol tri-3,3-dimethylbutyrate The above-described esters may be prepared by any suitable method. They may be prepared, for example, by direct esterification of the above-described acids and triols in the presence of an esterification catalyst, by reacting the alcohol with an acid chloride in pyridine or by ester exchange reaction wherein esters of the hexanetriols and/or esters of the monocarboxylic acids are reacted in the presence of an ester-exchange catalyst.

It is usually preferred, however, to prepare the esters by direct esterification. According to this method the acid and hexanetriol are heated together, and the water formed during the reaction is removed, preferably by distillation.

Catalysts may be used in the direct esterification process if desired but their presence is not essential to the success of the process. Suitable catalysts that may be used consist of p-toluene sulfonic acid, ethyl sulfonic acid, hydrobromic acid, chloroacetic acid, sulfuric acid, benzene sulfonic acid, formic acid, boron and silicon fluorides, acid salts, such as mono-sodium and mono-potassium sulfates, and salts of strong acids and weak bases, such as aluminum sulfate, zinc chloride, zinc sulfate, and the like. The amount of the catalyst employed will vary over a wide range depending upon the particular type of reactants, catalyst, and reaction conditions employed. In most cases, the amount of catalyst will vary between 0.1% to 5% by weight of reactants. Preferred amounts of catalyst to be employed in the esterification process vary between 0.5% to 2% by weight of reactants.

The amount of the acids and hexanetriols to be added to the reaction mixture may vary over a considerable range. As all three of the hydroxyl groups of the hexanetriols are to be esterified it is preferred to maintain the acid in excess of an equivalent amount per equivalent of alcohol. The equivalent ratios of acid to triol preferably vary between 1.1:1 and 1.5:1. The exact proportions of acid and alcohol to be used, however, may best be determined for each individual case.

The esterification may be accomplished in the presence or absence of solvents or diluents. In case the solvents or diluents are desired, inert organic compounds, such as benzene, toluene, cyclohexanone, and xylene, which do not interfere with the reaction may be used.

The temperature employed during the esterification may vary over a considerable range depending upon the type of reactants and catalysts to be employed. In most cases the temperature will range between about 40° C. to 250° C. with a preferred range being between 60° C. and 100° C.

Higher or lower temperatures may be employed if desired or necessary.

In some cases it may be desirable to conduct the reaction in an inert atmosphere, such as nitrogen, but such a precaution is not essential. Atmospheric, superatmospheric, or subatmospheric pressures may be used.

The separation of the esters formed in the reaction may be accomplished by any suitable means, such as extraction, distillation, fractional precipitation, and the like.

The preparation and some of the properties of the novel esters of the invention are illustrated by the following examples. It should be understood, however, that the examples are for the purpose of illustration and they are not to be regarded as limiting the invention in any way.

*Example I*

1,2,6-hexanetriol was prepared from acrolein dimer, 3,4 - dihydro - 1,2-pyran-2-carboxyaldehyde, by hydrolyzing the said dimer at 70° C. to 90° C. in the presence of hydroquinone and hydrogenating the resulting product in the presence of Raney nickel. About 1 mole of the 1,2-6-hexanetriol prepared by this method was added to a mixture containing 4.06 moles of caproic acid, 1 part p-toluene sulfonic acid, and 150 parts of toluene. The mixture was heated for four days with separation of 2.8 moles of water. The product was washed with 5 per cent sodium hydroxide solution, then with water, dried and Claisen distilled. 1,2,6-hexanetriol tricaproate ($n_D^{20}$ 1.4460) was collected at 168°/1 mm. to 226°/3 mm. The ester was a mobile, light yellow liquid.

*Example II*

1,2,6-hexanetriol (.76 mole) was added to a mixture containing 3.0 moles beta-ethylcaprylic acid, 1 part of p-toluene sulfonic acid and 200 parts of benzene. The mixture was heated and the water separated. The product was washed with 5 per cent NaOH, then water, dried and Claisen distilled. 1,2,6 - hexanetriol tri(beta-ethylcaprylate), a yellow liquid was collected as the final product.

*Example III*

Benzoyl chloride (3.8 moles) was added to 1,2,6-hexanetriol (.70 mole) in 5 moles of 20% sodium hydroxide. 1,2,6-hexanetriol tribenzoate, a yellow oil, was collected as final product.

*Example IV*

1,2,6-hexanetriol (1 mole) was added to a mixture containing about 4 moles of caprylic acid, 1 part p-toluene sulfonic acid and about 150 parts of toluene. The mixture was heated and the water separated. 1,2,6 - hexanetriol tricaprylate ($n_D^{20}$ 1.4509) was collected at 180–210° C. at 1 mm. The ester was a mobile, orange liquid.

*Example V*

1,2,6-hexanetriol (1 mole) was added to a mixture containing about 4 moles of isocaproic acid, 1 part of p-toluene sulfonic acid and about 150 parts of toluene. The mixture was heated and the water separated. 1,2,6-hexanetriol triisocaproate (B. P. 172–210°/1–2 mm.) was obtained as final product.

*Example VI*

1,2,6-hexanetriol (.76 moles) was added to a mixture containing about 3 moles of 3,3-dimethylbutyric acid, 1 part of p-toluene sulfonic acid and about 150 parts of toluene. The mixture was heated and the water separated. The product obtained was 1,2,6-hexanetriol tri-3,3-dimethylbutyrate (B. P. 184–214°/1–2 mm.).

*Example VII*

About 1 mole of 1,2,6-hexanetriol was added to a mixture containing about 4 moles of lauric acid, 1 part of p-toluene sulfonic acid and about 150 parts of toluene. The mixture was heated and the water separated. The product obtained was 1,2,6-hexanetriol trilaurate.

*Example VIII*

About 1 mole of 1,2,6-hexanetriol was added to a mixture containing about 4 moles of capric acid, 1 part of p-toluene sulfonic acid and about 150 parts of toluene. The mixture was heated and the water separated. The product obtained was 1,2,6-hexanetriol tricaprate.

*Example IX*

3-methyl-1,2,6-hexanetriol (1 mole) is reacted with 4.5 moles of cyclohexanoic acid in the presence of sulfuric acid as a catalyst. The resulting product is 3-methyl-1,2,6-hexanetriol tricyclohexanoate.

The esters of the hexanetriols and the monocarboxylic acids possess many unexpected properties which enable them to be utilized for a great many important industrial applications. They may be used, for example, as solvents, stabilizers, lubricants, and the like. Their industrial importance is particularly in evidence, however, when the said compounds are utilized as plasticizers for the vinyl-type resins. When utilized in this capacity they form compounded resins having many superior properties described above.

The vinyl-type polymers which may be plasticized by the novel esters of the invention are the homopolymers, copolymers and interpolymers of the vinyl-type monomers. The vinyl-type monomers include all those organic compounds containing at least one $CH_2=C<$ group in their molecule. Examples of the vinyl-type monomers are styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride, the vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate, the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether, and the vinyl ketones, such as vinyl butyl ketone, and vinyl ethyl ketone.

A particularly preferred group of vinyl-type polymers to be plasticized with the novel esters of the invention are the polymers of the polymerizable compounds of the group consisting of the vinylidene halides, acrylic acid, alpha-alkyl substituted acrylic acids wherein the alkyl radical contains from 1 to 4 carbon atoms, esters of acrylic acid and monohydric saturated alcohols containing from 1 to 5 carbon atoms, esters of alpha-alkyl substituted acrylic acids wherein the alkyl radical contains from 1 to 4 carbon atoms and monohydric saturated alcohols containing from 1 to 5 carbon atoms, vinyl acrylate, the esters of alpha-alkyl substituted acrylic acids wherein the alkyl radical contains from 1 to 4 carbon atoms and vinyl alcohol, the esters of the halogen acids and vinyl alcohol, acrylonitrile, methacrylonitrile, ethacrylonitrile, esters of saturated monocarboxylic acids containing from 1 to 5 carbon atoms and vinyl alcohol, styrene, and alkyl-substituted styrene, wherein the alkyl radical contains from 1 to 4 carbon atoms. Examples of this preferred group are homopolymers of vinylidene chloride, vinylidene fluoride, methacrylic acid, alpha-ethacrylic acid, alpha-butylacrylic acid, ethyl acrylate, amyl acrylate, methyl methacrylate, amyl alpha-butylacrylate, vinyl alpha-butylacrylate, vinyl chloride, vinyl bromide, vinyl iodide, vinyl acetate, vinyl pentanoate, alpha-butylstyrene; copolymers of vinylidene chloride and vinyl chloride, copolymers of methyl methacrylate and vinyl acetate, copolymers of ethyl acrylate and styrene, copolymers of methacrylonitrile and vinyl chloride; interpolymers of vinyl acetate, methyl methacrylate, and methacrylonitrile, interpolymers of styrene, vinyl chloride and ethyl acrylate, interpolymers of vinylidene chloride, vinyl chloride and methacrylic acid, and the like.

The polymers, copolymers and interpolymers to be plasticized with the esters of the hexanetriols may be prepared by any of the usual polymerization methods. Such methods include heating the monomeric material in the liquid or vapor phase or in a solvent, or in an emulsion with an immiscible liquid, with a peroxide catalyst, a per-acid catalyst, a per-salt catalyst, or an aromatic perester catalyst. The usual method for preparing the polymers comprises heating the monomer in an aqueous emulsion in the presence of an emulsifying agent and polymerization catalyst.

A single ester may be used as the plasticizer or a mixture of two or more of the compounds may be utilized. In addition, the esters of the 1,2,6-hexanetriols may be used as plasticizers in combination with minor amounts, e. g. 1% to 20%, of known plasticizers, such as dioctyl phthalate, dibutyl phthalate, tricresyl phosphate, and the like.

The amount of the esters of the hexanetriols to be incorporated with the above-described vinyl-type polymers may vary over a considerable range depending upon the particular type of polymer to be utilized, the intended use of the compounded resins, etc. In most cases the amount of the plasticizer will vary from about 20 to 150 parts by weight for every 100 parts by weight of resin. A more preferred range of plasticizer to be utilized comprises 40 parts to 75 parts by weight of plasticizer for every 100 parts by weight of resin.

Fillers and pigments such as whiting, channel black, clay, gum rosin, silica and others, and stabilizers, such as litharge, other lead compounds, some oxides of the bismuth and barium types and some silicates may also be added to the polymers along with the novel esters of the invention.

The vinyl-type resin compositions may be compounded by means of conventional equipment such as mills of the heated roll type or internal mixers. The plasticizer and other compounding ingredients, such as fillers and stabilizers, are worked into the vinyl resin so that they are thoroughly dispersed therein by means of such equipment, and the resultant composition then molded, calendered, extruded or otherwise formed into articles of the desired shape by convention procedure.

As stated above the vinyl resins plasticized with the novel esters of the invention possess many unexpected and superior properties over the same resins compounded with the plasticizers utilized heretofore in the art. The resulting compounded resins possess low volatility, increased resistance to water extraction, improved tensile strength, etc.

The following examples illustrate the use of the novel esters of the invention as plasticizers for the vinyl resins. It should be noted, however, that the examples are for the purpose of illustration and they are not to be regarded as limiting the invention in any way.

The volatility of the plasticizer from the compounded vinyl resins was determined by preparing discs of the said compounded resin of definite size and exposing them to a constant temperature of 100° C. with the air being allowed to circulate freely. The loss of plasticizer was determined by periodic weighings. In the following examples the volatility of the plasticizer is shown in comparison to the volatility of dioctyl phthalate from the same resins which is taken as 1.

The water extraction values were determined by the use of similar discs which were heated for two hours at 100° C., weighed to obtain the original dry weight, suspended for 10 days in 400 cc. of distilled water, which was changed every other day, then dried at 80° C. and weighed. The results obtained were utilized in the following formula:

Water extraction =
$$\left[\frac{\text{original dry weight} - \text{final dry weight}}{\text{original dry weight}}\right] \times 100$$

*Example X*

(a) About 100 parts of polyvinyl chloride was compounded with about 60 parts of glycerol tricaproate. Discs prepared from the compounded resin decreased in size and became brittle after prolonged exposure to relatively high temperatures. The volatility of the glycerol tricaproate from the resin was found to be 2.7 times that of dioctyl phthalate.

(b) About 100 parts of polyvinyl chloride was compounded with about 60 parts of 1,2,6-hexanetriol tripropionate. Discs prepared from the compounded resin decreased in size and became brittle after prolonged exposures to relatively high temperatures. The volatility of the hexanetriol tripropionate from this resin was determined to be 9.3 times that of dioctyl phthalate. In addition the compounded resin had a relatively high brittle temperature and a high water extraction value of 6.6%.

(c) About 100 parts of polyvinyl chloride was compounded with about 60 parts of 1,2,6-hexanetriol tributyrate. Discs prepared from the compounded resin decreased in size and became brittle after exposure to relatively high temperatures for prolonged periods. The volatility of the hexanetriol tributyrate was 5.2 times that of dioctyl phthalate.

(d) About 100 parts of polyvinyl chloride was compounded with about 60 parts of 1,2,6-hexanetriol tricaproate. Discs prepared from the compounded resin possessed excellent flexibility and tensile strength and underwent very little change in shape or structure when exposed to relatively high temperatures. The volatility of 1,2,6-hexanetriol tricaproate was discovered unexpectedly to be only 0.6 times that of dioctyl phthalate.

The compound resin possessed a surprisingly low water extraction value of only 0.6%.

Example XI

About 100 parts of a copolymer of 95% vinyl chloride and 5% vinyl acetate was compounded with about 60 parts of 1,2,6-hexanetriol tri(3,3-dimethylbutyrate). The resulting compounded resin possessed excellent flexibility and tensile strength and underwent very little change in shape or structure when exposed to high temperatures. The compounded resin had a water extraction value of 0.1%.

Example XII

About 100 parts of a copolymer of 95% vinyl chloride and 5% vinyl acetate was compounded with about 60 parts of 1,2,6-hexanetriol tri(isocaproate). The resulting resin possessed subtantially the same properties as the resin disclosed under X (d) above.

Example XIII

About 100 parts of polyvinyl chloride was compounded with about 60 parts of 1,2,6-hexanetriol tricaprylate. The resulting resin possessed excellent flexibility, tensile strength and color, and underwent very little change in shape or structure when exposed to high temperatures. The compounded resin had a water extraction value of 0.3%.

Example XIV

About 100 parts of polyvinyl chloride was compounded with 50 parts of 1,2,6-hexanetriol tribenzoate. The resulting resin possessed excellent tensile strength and color, and underwent very little change in shape or structure when exposed to high temperatures.

We claim as our invention:

1. A triester of a hexanetriol of the group consisting of 1,2,6-hexanetriol and the lower alkyl-substituted 1,2,6-hexanetriols with a monocarboxylic acid containing from 5 to 15 carbon atoms.
2. A triester of 1,2,6-hexanetriol and an open-chain, saturated monocarboxylic acid containing from 5 to 9 carbon atoms and possessing a straight chain of at least four carbon atoms attached directly to the carboxyl group.
3. 1,2,6-hexanetriol tribenzoate.
4. 1,2,6-hexanetriol tri-3,3-dimethyl butyrate.
5. 1,2,6-hexanetriol tripelargonate.
6. 1,2,6-hexanetriol tricaproate.
7. 1,2,6-hexanetriol tri(beta-ethylcaprylate).

RICHARD R. WHETSTONE.
DE LOSS E. WINKLER.

REFERENCES CITED

The following references are of record in the file of this patent:

UNITED STATES PATENTS

| Number | Name | Date |
|---|---|---|
| 2,382,297 | Cupery | Aug. 14, 1945 |
| 2,409,548 | Debacher | Oct. 15, 1946 |
| 2,413,613 | Eckey | Dec. 31, 1946 |
| 2,441,555 | Barth | May 18, 1948 |
| 2,460,186 | Moffett | Jan. 25, 1949 |

FOREIGN PATENTS

| Number | Country | Date |
|---|---|---|
| 468,533 | Great Britain | July 7, 1937 |
| 878,665 | France | Oct. 26, 1942 |

OTHER REFERENCES

Chem. Abst. 17: 537$_{7,9}$.

Fieser et al.: "Organic Chemistry" (D. C. Heath; Boston; 1944), page 32.